No. 864,796. PATENTED SEPT. 3, 1907.
W. T. NEFF.
DEVICE FOR BREAKING HORSES OF KICKING.
APPLICATION FILED AUG. 9, 1906.
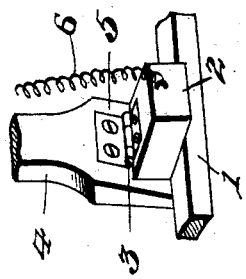
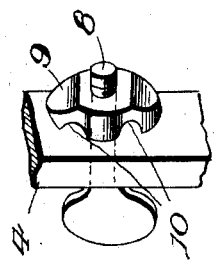
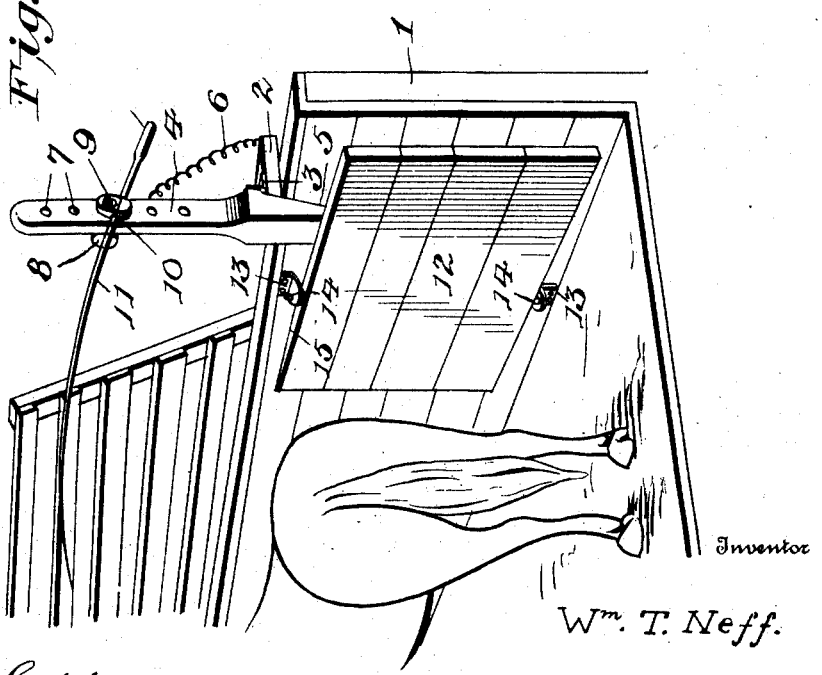
Inventor
Wm. T. Neff.
Witnesses

UNITED STATES PATENT OFFICE.

WILLIAM THEODORE NEFF, OF TREMONT CITY, OHIO, ASSIGNOR TO BERZELIUS LAENNEC BARR, OF TREMONT CITY, OHIO.

DEVICE FOR BREAKING HORSES OF KICKING.

No. 864,796.  Specification of Letters Patent.  Patented Sept. 3, 1907.

Application filed August 9, 1906. Serial No. 329,914.

*To all whom it may concern:*

Be it known that I, WILLIAM THEODORE NEFF, a citizen of the United States, residing at Tremont City, in the county of Clark and State of Ohio, have invented certain new and useful Improvements in a Device for Breaking Horses of Kicking; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to an improvement in devices for curing horses and other animals of the habit of kicking and particularly to that class which automatically chastises the animal.

The object of the invention is the production of an apparatus of the kind described which shall embrace means by which the animal shall receive chastisement as a result of and immediately subsequent to the act of kicking, the curative value of the chastisement being greatest at such time.

Another object is to provide a whipping device which shall embody few parts of simple construction, be easily attached to and detached from the desired place in a stall and in which the whip-holding means is adjustable in order that the most effective blow can be delivered to the animal, irrespective of its size.

The preferred embodiment of the details of my invention will now be described in the following specification and then particularly pointed out in the claims, reference being had to the accompanying drawings, in which Figure 1 is a perspective of my improvement, showing the device in operative position in a stall. Fig. 2 is a detail perspective of the whip-holding means, showing a slight modification. Fig. 3 is a detail perspective illustrating the means of attaching the whip lever to its support.

Referring now to the drawings, in which like reference numerals refer to like parts throughout the several views, 1 represents the side wall of a stall, on the top of which is rigidly fixed a supporting-block 2 to which is attached, by hinge connection 3, a whip-lever 4, the rear face of the latter being tapered from said hinge connection toward its lower end, as shown at 5, to permit play of the lever. One end of a coil spring 6 is attached to the rear face of the lever and the other end is fixed to the rear face of the supporting-block 2, said spring being relieved from tension when the device is at rest in normal position. The lever 4 is provided with a longitudinal series of apertures 7, adapted to receive thumb-screw 8 which, after being passed through one of said apertures is intended to receive a whip-clamp 9, suitably bored and threaded. The whip-clamp 9, of any desired configuration, is provided on its inner face with one or more transverse grooves 10, designed to receive and hold in desired position a whip 11, as shown in Fig. 1.

A kicking-board 12 is pivotally supported from the side wall of the stall through the medium of angle-plates 13, firmly attached thereto, the pivot-pins 14 of said plates seating in apertures formed in the upper and lower edges of the kicking-board. These pivotal connections are positioned on one side of the median line of the board in order that unequal lengths of said board shall lie on the respective sides of the connections, the shorter length being tapered its full width from the pivot connections toward its free end, as at 15, to permit greater throw of the free end of the longer section of the board, the lower end of the lever 4 extending behind and slightly below the upper edge of the longer section of the kicking-board and normally holding it spaced from the stall.

The operation of the device is as follows: The clamp 9 is adjusted to desired height on the lever 4, the whip inserted in groove 10 in the clamp and the latter turned on thumb-screw 8 until the rear face of the clamp abuts lever 4, the correct angle of the whip being secured and maintained by slightly turning the clamp in one or the other direction as may be necessary. Assuming that the parts are in operative position, the horse kicks against the longer section of the kicking-board and forces it against the stall side, thus throwing the lower end of the whip-lever in and causing the upper portion thereof to be suddenly moved toward the animal and resulting of course in its receiving a sharp blow from the whip, the spring 6, when the whip-lever has reached its limit of movement, returning it to normal position, as will be obvious.

From the foregoing it will be evident that I have provided a simply-constructed device which is adapted to be quickly and readily attached to any stall of ordinary construction, which can be positioned to one side or the rear of the animal therein with equal effectiveness and which applies chastisement to the animal immediately subsequent to its kicking the kicking-board, and which, after applying chastisement, automatically assumes normal position.

Having thus described my invention, what I claim as new and desire to secure by Letters Patent, is:—

1. In an apparatus of the class described, the combination with a support, of a kicking-board movably connected to the support, a lever operated by the movement of the kicking-board, and means carried by the lever for adjustably supporting a whip.

2. In an apparatus of the class described, the combination with a support, of a kicking-board movably connected thereto, a lever operated by the movement of the kicking-board, means carried by the lever for supporting a whip at an angle to the lever, said lever being formed with means to permit adjustment of the whip-supporting means longitudinally of the lever.

3. In an apparatus of the class described, the combination with a support, of a kicking-board movably connected thereto, a lever operated by the movement of the kicking-board, and a whip-clamp carried by the lever and adjustable to vary the inclination of the whip relative to the lever, said lever being formed with means to permit adjustment of the whip-clamp longitudinally of the lever.

4. In an apparatus of the class described, the combination with a support, of a kicking-board, means for pivotally supporting the upper and lower edges of said board, a lever operated by the movement of the board, and a whip-clamp carried by the lever, the face of the board next the support being gradually reduced in thickness toward one end, whereby to increase the throw of the opposite end.

5. In an apparatus of the class described, the combination with a support, of a kicking-board pivotally connected at its upper and lower edges with the support, said connections being arranged to provide unequal lengths of the kicking-board on the respective sides of the pivots, a lever mounted on the support and depending in rear of the longer portion of the board, a whip-clamp carried by the lever, the surface of the shorter length of board next the support being gradually reduced in thickness toward the free end, whereby to allow greater scope of movement for the free end of the longer portion of the board.

In testimony whereof, I affix my signature, in presence of two witnesses.

WILLIAM THEODORE NEFF.

Witnesses:
E. C. NICHOLS,
KYLE COLLINS.